United States Patent
Taguchi et al.

(10) Patent No.: US 7,201,983 B2
(45) Date of Patent: Apr. 10, 2007

(54) HYDROGEN GENERATION APPARATUS AND METHOD AND FUEL CELL SYSTEM

(75) Inventors: Kiyoshi Taguchi, Osaka (JP); Kunihiro Ukai, Ikoma (JP); Hidenobu Wakita, Yawata (JP); Seiji Fujihara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 474 days.

(21) Appl. No.: 10/323,040

(22) Filed: Dec. 19, 2002

(65) Prior Publication Data

US 2003/0157382 A1 Aug. 21, 2003

(30) Foreign Application Priority Data

Dec. 28, 2001 (JP) ............................. 2001-400372

(51) Int. Cl.
*H01M 8/06* (2006.01)
*B01J 8/04* (2006.01)
*C01B 3/26* (2006.01)

(52) U.S. Cl. .................. 429/20; 422/188; 423/652; 48/127.9; 48/197

(58) Field of Classification Search ............. None
See application file for complete search history.

(56) References Cited

U.S. PATENT DOCUMENTS 3,677,823 A 7/1972 Trocciola

| | | |
|---|---|---|
| 4,539,267 A | 9/1985 | Sederquist |
| 6,103,411 A | 8/2000 | Matsubayashi et al. |
| 2003/0129470 A1* | 7/2003 | Tajima et al. ................. 429/34 |
| 2004/0079031 A1* | 4/2004 | Seaba et al. ............... 48/127.9 |

FOREIGN PATENT DOCUMENTS

| EP | 1182720 A | 2/2002 |
|---|---|---|
| JP | 57-209803 A | 12/1982 |
| JP | 06-132038 | 5/1994 |
| JP | 10-330101 | 12/1998 |
| JP | 11-106204 | 4/1999 |
| JP | 2001-143733 | 5/2001 |
| JP | 2002-260702 A | 9/2002 |
| WO | WO 01/48849 A | 7/2001 |

OTHER PUBLICATIONS

European Search Report for EP 02 02 8702, dated Jun. 8, 2004.

* cited by examiner

*Primary Examiner*—John S. Maples
(74) *Attorney, Agent, or Firm*—RatnerPrestia (57) ABSTRACT

A hydrogen generation apparatus has
- a reformer of generating a reformed gas containing at least hydrogen and carbon monoxide by making a material containing an organic compound react with water;
- carbon-monoxide-removing means of including at least a shifter of reducing the carbon monoxide contained in the reformed gas generated by the reformer in accordance with a shift reaction; and
- material-humidifying means of humidifying the material by directly or indirectly using moisture contained in the reformed gas.

4 Claims, 7 Drawing Sheets

HYDROGEN GENERATION APPARATUS AND METHOD AND FUEL CELL SYSTEM

BACKGROUND OF THE INVENTION

1. Field of the Invention

The present invention relates to a hydrogen generation apparatus of generating a reformed gas by reforming a fuel such as a hydrocarbon-based fuel and to a fuel cell system or the like using the hydrogen generation apparatus.

2. Related Art of the Invention

Because a fuel-cell power-generating system using a fuel cell has a high power-generation efficiency and moreover, the heat produced with power generation can be effectively used, application of the system to household cogeneration is expected.

In the case of a household purpose, it is preferable to operate a fuel-cell power-generating system at a comparatively low temperature from the viewpoints of correspondence to frequent start/stop of an apparatus, durability of the apparatus, and cost cutting. Therefore, development of a polymer electric fuel cell using a polymer electrolytic film as a power-generating section is progressed.

Most fuel cells generate power by using hydrogen as a fuel. However, because a reformed-gas infrastructure is not prepared at present, a power-generating system uses not only a fuel cell but also a hydrogen generation apparatus provided with a reformer of generating a reformed gas containing hydrogen by making a hydrocarbon component such as natural gas or LPG, alcohol such as methanol, or a material such as a naphtha component react with water.

Not only hydrogen but also carbon dioxide and carbon monoxide are contained in the reformed gas generated by the reformer as auxiliary components. Because a polymer electric fuel cell being currently developed operates at a low temperature of 100° C. or lower, it is necessary to minimize the carbon monoxide contained in a reformed gas in order to maintain the activity of a cell electrode catalyst. Therefore, a hydrogen generation apparatus has a configuration of using not only a reformer of generating a reformed gas but also a carbon-monoxide-removing section constituted by a shifter of making carbon monoxide shift-react with water and a purifying section of oxidizing carbon monoxide.

The efficiency of the hydrogen generation apparatus is further deteriorated as the heat quantity to heat the reformer up to a temperature necessary for a reforming reaction increases.

The hydrogen generation apparatus makes a material such as hydrocarbon react with vaporized water. However, because water has an extremely-large amount of evaporative latent heat, the reformer requires much heat in order to vaporized water. Therefore, it is difficult to raise the efficiency of the hydrogen generation apparatus up to a certain value or more.

On the other hand, because the shift reaction is an exothermic equilibrium reaction, the shifter of performing a shift reaction located at the downstream side of the reformer more easily reduces carbon monoxide as the ratio of water vapor to a reformed gas increases at a low temperature and the quantity of air to be supplied necessary for a reaction can be decreased in the purifying section at the downstream side of the shifter. Therefore, excessive consumption of hydrogen can be controlled and stable operations can be performed. By increasing the quantity of water vapor and raising a temperature, it is possible to further downsize the shifter by decreasing a catalyst volume because the shift reaction rate increases.

However, because the water vapor in the shifter is obtained by the reformer and a large amount of evaporative latent heat is necessary in order to increase the quantity of water vapor as described above, the heat quantity required to heat the reformer increases and increasing the quantity of water vapor in the reformer in order to improve the efficiency of the shifter and downsize the section causes the efficiency of the reformer to lower.

To prevent the above mentioned, a technique is proposed which performs humidification by adding separately-prepared water to a material gas (for example, refer to Japanese Patent Laid-Open No. 10-330101 and Japanese Patent Laid-Open No. 11-106204). Thereby, because evaporative latent heat to change water to water vapor is decreased, it is possible to reduce the heat quantity necessary for a reforming device and improve the efficiency of a shift reaction in the shifter. Moreover, by using the carbon-monoxide-removing section or the heat of the cooling water for a fuel cell, it is possible to perform humidification without lowering the efficiency.

However, a material gas used for a conventional hydrogen generation apparatus is only humidified by using a heat source in the generator. Thereby, problems occur that improvement of efficiency is limited and piping for heat recovery and humidification becomes complicated.

SUMMARY OF THE INVENTION

The present invention is achieved to solve the above problems on the conventional hydrogen generation apparatus and its object is to provide a hydrogen generation apparatus operating at a high efficiency while humidifying a material gas with a simple structure and at a low heat quantity and a fuel-cell power-generating system using the hydrogen generation apparatus.

The 1st invention of the present invention is a hydrogen generation apparatus comprising:

a reformer of generating a reformed gas containing at least hydrogen and carbon monoxide by making a material containing an organic compound react with water;

carbon-monoxide-removing means of including at least a shifter of reducing said carbon monoxide contained in said reformed gas generated by said reformer in accordance with a shift reaction; and material-humidifying means of humidifying said material by directly or indirectly using moisture contained in said reformed gas.

The 2nd invention of the present invention is the hydrogen generation apparatus according to the 1st invention, wherein said material-humidifying means humidifies said material by at least using the moisture contained in an off-gas discharged from a fuel cell operated by said reformed gas output from said carbon-monoxide-removing means.

The 3rd invention of the present invention is the hydrogen generation apparatus according to the 1st invention, wherein said material-humidifying means humidifies said material by using the moisture contained in the reformed gas output from said carbon-monoxide-removing means.

The 4th invention of the present invention is the hydrogen generation apparatus according to the 2nd or the 3rd inventions, wherein said material-humidifying means has a transmission film of transmitting at least moisture and said transmission film is provided so as to form the boundary between the path of said off-gas or said reformed gas and the path of said material.

The 5th invention of the present invention is the hydrogen generation apparatus according to the 4th invention, wherein said transmission film also transmits hydrogen.

The 6th invention of the present invention is the hydrogen generation apparatus according to the 2nd invention,
wherein said material-humidifying means comprises:
a hydrophilic proton conductor provided to form the boundary between the path of said off-gas and the path of said material; and
voltage-applying means of applying a voltage to said hydrophilic proton conductor.

The 7th invention of the present invention is the hydrogen generation apparatus according to the 4th invention, wherein said material-humidifying means heat-exchanges said off-gas or said reformed gas with said material.

The 8th invention of the present invention is the hydrogen generation apparatus according to the 6th invention,
wherein said off-gas is used to heat said reformer, and
said voltage-applying means controls the temperature of said reformer by adjusting a voltage to be applied to said hydrophilic proton conductor.

The 9th invention of the present invention is a fuel-cell power-generating system comprising:
the hydrogen generation apparatus according to any one of the 1st, the 2nd, the 3rd, the 6th or the 8th inventions; and
a fuel cell of generating power by the reformed gas supplied from said hydrogen generation apparatus.

The 10th invention of the present invention is a fuel-cell power-generating system comprising:
a reformer of generating a reformed gas containing at least hydrogen and carbon monoxide by making a material containing an organic compound react with water;
carbon-monoxide-removing means containing at least a shifter of reducing said carbon monoxide contained in the reformed gas generated by said reformer in accordance with a shift reaction;
a fuel cell of generating power by said reformed gas output from said carbon-monoxide-removing means; and
material-humidifying means of humidifying said material,
wherein said material-humidifying means has a hydrothermal carrying body of supplying water to said material and circulating means of making said hydrothermal carrying body circulate, and
said hydrothermal carrying body heat-exchanges with said fuel cell.

The 11th invention of the present invention is the fuel-cell power-generating system according to the 10th invention, wherein the quantity of the water to be supplied to said material is controlled in accordance with the temperature of said hydrothermal carrying body.

The 12th invention of the present invention is a hydrogen-generating method comprising:
a reforming step of generating a reformed gas containing at least hydrogen and carbon monoxide by making a material containing an organic compound react with water;
a carbon-monoxide-removing step of including at least a shifting step of reducing said carbon monoxide in the reformed gas generated in said reforming step in accordance with a shift reaction; and
a material-humidifying step of humidifying said material by directly or indirectly using moisture contained in said reformed gas.

The 13th invention of the present invention is the hydrogen-generating method according to the 12th invention,
wherein said material-humidifying step includes a step of humidifying said material by at least using the moisture contained in an off-gas discharged from a fuel cell to be operated by the reformed gas output through said carbon-monoxide-removing step, and the hydrogen-generating method further comprising
a voltage-applying step of applying a voltage to a hydrophilic proton conductor provided to form the boundary between the path of said off-gas and the path of said material by using said hydrophilic proton conductor.

The 14th invention of the present invention is the hydrogen-generating method according to the 13th invention, wherein the temperature in said reforming step is controlled by using said off-gas to heat in said reforming step and adjusting a voltage to be applied to said hydrophilic proton conductor in said voltage-applying step.

DESCRIPTION OF SYMBOLS

1 . . . Reformer
2 . . . Heating section
3 . . . Material-supplying section
4 . . . Reforming water-supplying section
5 . . . CO-shifter
6 . . . Air-supplying section
7 . . . CO-purifying section
8 . . . Fuel-cell power-generating section
9, 69 . . . Material-humidifying section
10 . . . Cooling-water-circulating section
11 . . . Cooling-water-temperature-detecting section
12 . . . Combustion-gas-supplying section
30, 40, 50 . . . Total-heat-exchanging section
51 . . . Shifting-water-supplying section
71 . . . Humidifying-water-temperature-detecting section

DESCRIPTION OF THE EMBODIMENTS

Embodiments of the present invention are described below by referring to the accompanying drawings.

(Embodiment 1)

Figure 1:
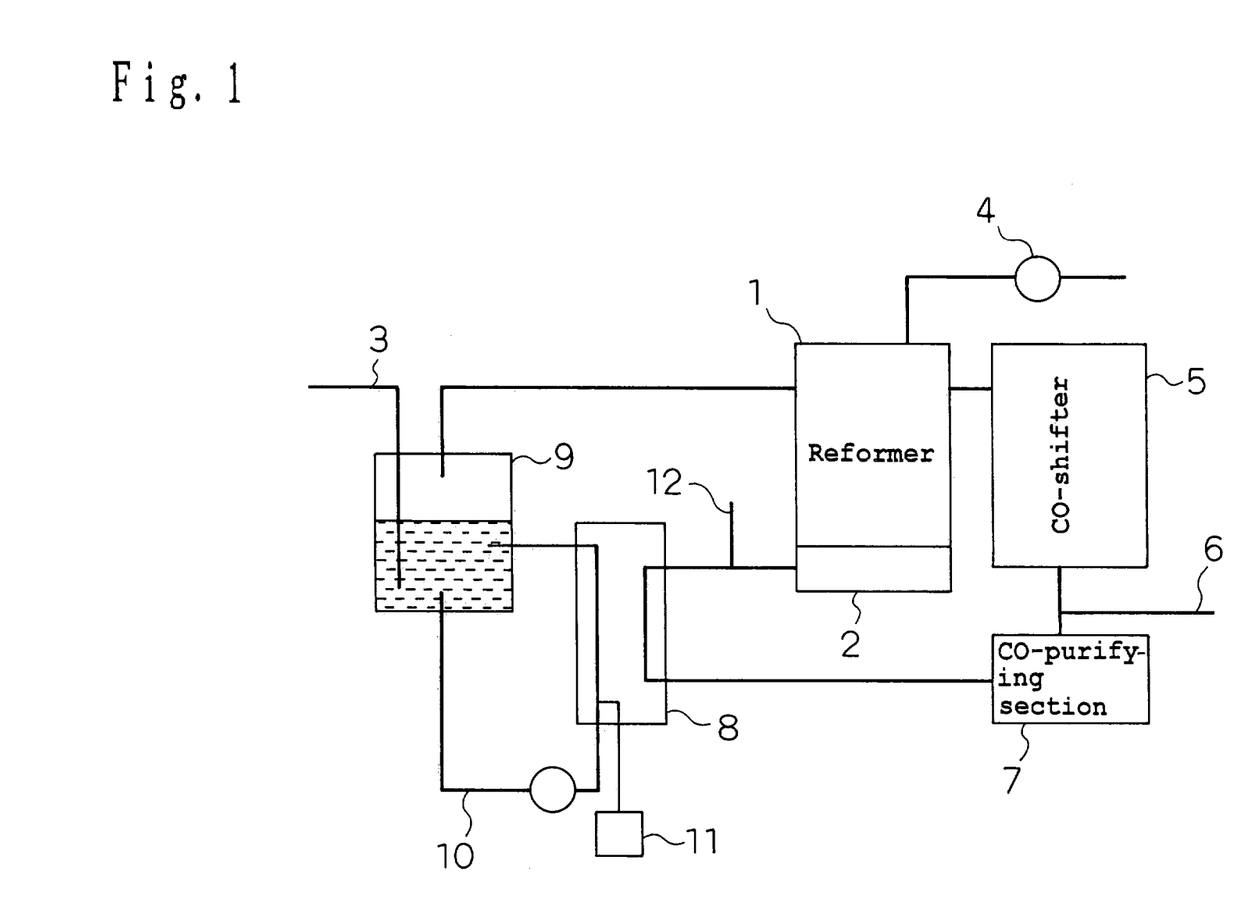
FIG. 1 is a schematic longitudinal sectional view showing a configuration of a fuel-cell power-generating system of an embodiment 1 of the present invention.

Firstly, a configuration of a fuel-cell power-generating system of this embodiment is described below by referring to FIG. 1. FIG. 1 is a schematic sectional view showing a configuration of a hydrogen generation apparatus of this embodiment.

In FIG. 1, reference numeral 1 denotes a reformer, 2 denotes a heating section of heating the reformer, 3 denotes a material-supplying section of supplying a material to the reformer 1, and 4 denotes a reforming water-supplying section for supplying water to the reformer 1. The reformer 1, the material supplying section 3, and the reforming water-supplying section 4 constitute a reformer of the present invention. A CO-shifter 5 corresponding to a shifter of the present invention is set at the downstream side of the reformer 1 and an air-supplying section 6 and a CO-purifying section 7 corresponding to a part of carbon-monoxide-removing means of the present invention are set at the downstream side of the CO-shifter 5. The CO-shifter 5 and CO-purifying section 7 constitute carbon-monoxide-removing means of the present invention. A fuel-cell power-generating section 8 corresponding to a fuel cell of the present invention is set at the downstream side of the CO-purifying section 7. Reference numeral 9 denotes a material-humidifying section corresponding to material-humidifying means of the present invention and 10 denotes a cooling-water-circulating section of circulating cooling water through the fuel-cell power-generating section 8. The temperature of cooling water serving as a hydrothermal carrying body of the present invention is detected by a cooling-water-temperature detector 11. Reference numeral 12 denotes a combustion-gas-supplying section of supplying a combustion gas to the heating section. A reformed catalyst obtained by carrying Ru to alumina is set into the reformer 1, a transforming catalyst made of copper and zinc is set into the CO-shifter 5, and a CO-purifying catalyst obtained by carrying Pt to alumina is set into the CO-purifying section 7. These catalysts are catalysts generally used for a hydrogen generation apparatus. Even if using other catalysts having the same functions, advantages of the present invention are not changed. For example, an Ni catalyst is used as a reforming catalyst, a Pt catalyst or Fe—Cr catalyst is used as a CO-transforming catalyst, and a Ru catalyst or the like is used as a CO-purifying catalyst.

Then, operations of a fuel-cell power-generating system of the present invention will be described below.

Materials to be supplied to the reformer 1 include natural gas, methanol, and gasoline and reforming types include water-vapor reforming performed by adding water vapor and partial reforming performed by adding air. A case of obtaining a reformed gas by water-vapor-reforming a natural gas will be described below.

A natural gas that is a material is supplied from the material-supplying section 3 to the reformer 1. Water is supplied from the reforming water-supplying section 4 to the reformer 1 and vaporized into water vapor in the reformer 1. The water vapor is mixed with a material and brought into contact with a reformed catalyst set into the reformer 1.

The reformed catalyst is heated so as to have a temperature close to about 700° C. and the material is made to react with water vapor and converted into a reformed gas mainly containing hydrogen. Though the composition of the generated reformed gas slightly depends on the temperature of the reformed catalyst, approx. 80% of hydrogen and approx. 10% of carbon dioxide and approx. 10% of carbon monoxide are respectively contained as an average value excluding water vapor. The CO concentration of the reformed gas is reduced to approx. 0.5% through a shift reaction in the CO-shifter 5 set at the downstream side of the reformer 1 and then further reduced to 10 ppm or less by making oxygen in the air supplied from the purifying-air-supplying section 6 react with CO.

Thus, the reformed gas excluding CO is supplied to the fuel-cell power-generating section 8. Because heat is generated simultaneously with electricity under power generation, the fuel-cell power-generating section 8 is cooled by the cooling water supplied by the cooling-water-circulating section 10 to keep a constant temperature. The temperature of the fuel-cell power-generating section 8 is controlled by fluctuating the quantity of cooling water so that the temperature to be detected by the cooling-water temperature detector 11 becomes constant.

The heated cooling water is sent to the material-humidifying section 9 and used to humidify the material supplied from the material-supplying section 3. The material-humidifying section 9 operates so that the material sufficiently contacts with water and the material is humidified up to the dew point at a cooling-water temperature. The humidified material is supplied to the reformer 1. Because the cooling-water temperature is generally set to 65° C. to 90° C. at which the fuel-cell power-generating section 8 shows a high property, the S/C (the ratio of water vapor and carbon in material) after passing through the material-humidifying section 9 approximately ranges between 0.5 and 2. Therefore, water is additionally supplied by the reforming water-supplying section 4 so that the S/C ranges between 2.5 to 3.5 at the reformer 1. When the cooling-water temperature sufficiently rises, it is unnecessary to supply water from the reforming water-supplying section 4 to the reformer 1 because it is possible to mix a necessary quantity of water with the material. Moreover, it is possible to correspond to a case of starting the apparatus or a case of continuing operations while changing temperatures of the fuel-cell power-generating section 8 by calculating the humidifying degree of the material in accordance with the cooling-water temperature detected by the cooling-water-temperature detector 11 and controlling the water quantity to be additionally supplied from the reforming water-supplying section 4.

Then, the operational principle of this embodiment will be described below. Though a cogeneration system using a fuel-cell power-generating system also effectively uses the heat produced with power generation from the viewpoint of the demand balance between power and heat of a general home, it is necessary to improve a power ratio, that is, a power-generation efficiency. To improve the power-generation efficiency, it is necessary to improve the efficiency of a hydrogen generation apparatus. Therefore, it is generally contrived to effectively use the heat of the exhaust gas of a combusting section of heating a reformer or reduce the loss of the heat released from the hydrogen generation apparatus.

However, to recover low-temperature exhaust heat, a wide heat-exchange area is necessary. Because this causes the apparatus to be increased in size, it is difficult to improve the efficiency up to a certain level or higher. Particularly, the water to react with a material in accordance with a reforming reaction has a large amount of evaporative latent heat and this prevents the efficiency from being improved. Moreover, a fuel-cell power-generating section is generally operated so that a temperature of 65° to 90° C. is kept constant by cooling the heat produced for at the time of power generation with cooling water. The heat is generally used for hot-water supply.

On the other hand, because this embodiment makes it possible to use some of the heat produced in the fuel-cell power-generating section 8 for humidification of a material and take out some of the water vapor necessary for the reformer 1, it is possible to control the heating value used to vaporize the water to be supplied to the hydrogen generation apparatus. To efficiently vaporize water at the atmospheric pressure, a temperature of 100° C. or higher is necessary. However, by bringing a material into contact with the water of lower than 100° C., it is possible to efficiently recover heat from a low-temperature heat source such as the fuel-cell power-generating section 8, efficiently obtain water vapor at a heating value smaller than the case of vaporizing water, and improve the efficiency of the hydrogen generation apparatus.

This embodiment uses a section having a configuration of circulating a material gas through a tank of storing cooling water as the material-humidifying section 9. However, it is allowed to use any means as the material-humidifying means of the present invention as long as the means has a configuration capable of efficiently bringing cooling water into contact with a material gas. Moreover, it is allowed to use a configuration capable of bringing the water heated through heat exchange with cooling water into contact with a material. Furthermore, a hydrothermal carrying body of the present invention is described as cooling water of directly supplying heat and moisture to a material. Instead, however, it is also possible to heat water with a heat medium such as ethylene glycol and humidify a material with the heated water. In this case, the heat medium indirectly supplies heat and moisture to the material.

Moreover, the fuel-cell power-generating section 8 is generally constituted by holding polymer electrolytes with flat electrodes coated with the carbon carrying a noble metal, partitioning them with carbon or metallic separators, and laminating them. In the case of this embodiment, though the section 8 is constituted so as to circulate water by forming a cooling-water channel on the above separators, it is also allowed that the cooling section is constituted so as to efficiently remove the heat produced by electrodes of the fuel-cell power-generating section 8.

(Embodiment 2)

Figure 2:
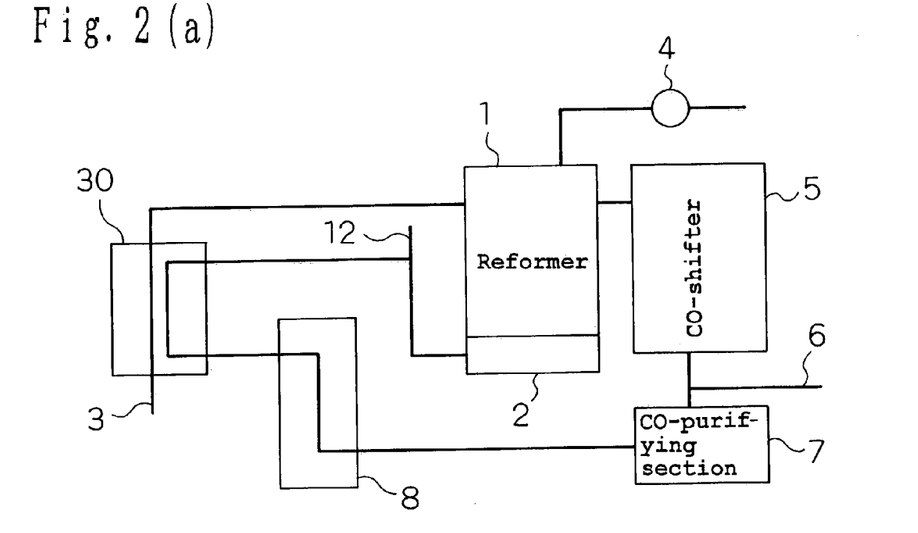
FIG. 2(a) is a schematic longitudinal sectional view showing a configuration of the fuel-cell power-generating system of an embodiment 2 of the present invention.
FIG. 2(b) is a schematic longitudinal sectional view showing a configuration of a material-humidifying section of the fuel-cell power-generating system of the embodiment 2 of the present invention.

Then, embodiment 2 of the present invention will be described below. As shown in FIG. 2(*a*), this embodiment is similar to the embodiment 1 except that a total-heat exchanger 30 corresponding to the material-humidifying means of the present invention is provided at the downstream side of the fuel-cell power-generating section 8. Therefore, this embodiment is described mainly on points different from the embodiment 1 by providing FIG.2(*a*) with the same symbol for same portions or corresponding portions as that of FIG.1 and omitting detailed descriptions, and thereby an example of a hydrogen generation apparatus of and an example of a hydrogen-generating method of the present invention are described below.

FIG. 2(*a*) is a schematic sectional view showing a configuration of a fuel-cell power-generating system of this embodiment. Are formed gas generated by a hydrogen generation apparatus is supplied to a fuel-cell power-generating section 8, and most hydrogen is consumed for power generation and discharged as an off-gas. Because the off-gas still contains hydrogen, it is burned together with a heating fuel supplied from a combustion-gas-supplying section 12 by a heating section 2 to heat a reformer 1.

Because a large amount of water vapor is contained in the off-gas, the flame temperature is lowered and the efficiency of the reformer 1 is deteriorated when directly burning the off-gas in the heating section 2.

In the case of this embodiment, however, the off-gas is fully heat-exchanged with a material supplied from the material-supplying section 3 in the total-heat-exchanging section 30. Moreover, as shown in FIG. 2(*b*), because a water-transmitting film 30*a* of separating an off-gas from a material and forming the boundary between the paths of the off-gas and the material is formed in the total-heat-exchanging section 30, the water vapor in the off-gas moves to the material through the water-transmitting film 30*a* to humidify the material.

Thus, by humidifying the material and obtaining a part of the water vapor for reforming reaction from the material, it is possible to decrease the quantity of the water to be supplied from the reforming water-supplying section 4 to the reformer 1 and control the heating value of the reformer 1. Moreover, because the water vapor contained in the off-gas is simultaneously removed and thereby, the flame temperature in the heating section 2 is prevented from lowering, the efficiency of the hydrogen generation apparatus is further improved.

Though this embodiment uses a water-transmitting film as a transmitting film of the present invention and an electrolytic film used for a polymer fuel cell, any film can be used as long as the film allows water to transmit (such as water-transmitting polymer film). Even in the case of a film formed by a material such as zeolite capable of transmitting water, the same effect can be obtained.

(Embodiment 3)

Figure 3:
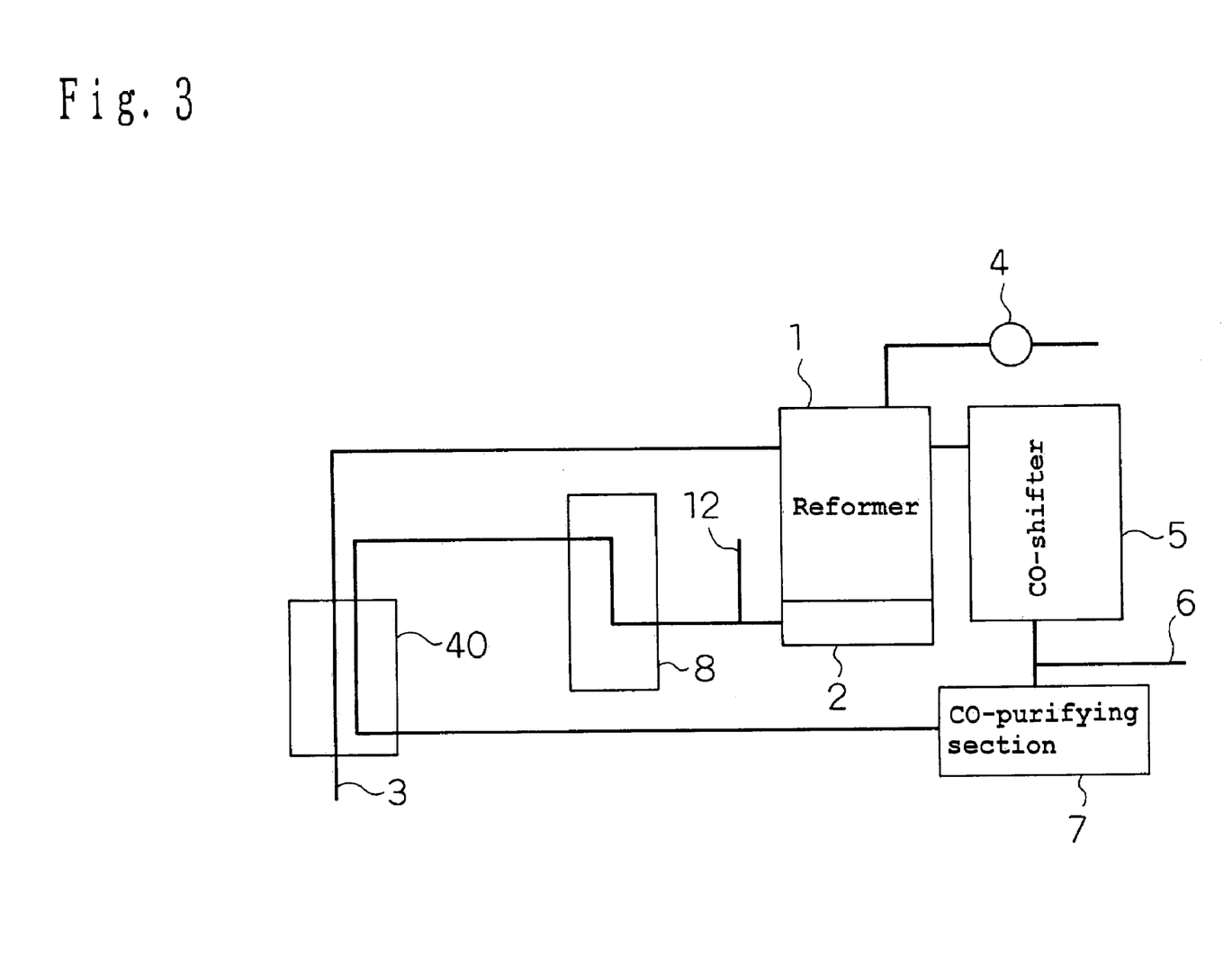
FIG. 3 is a schematic longitudinal sectional view showing a configuration of the fuel-cell power-generating system of an embodiment 3 of the present invention.

Then, embodiment 3 of the present invention will be described below. As shown in FIG. 3, the embodiment 3 is similar to the embodiment 2 except that a full-heat exchanger 40 corresponding to material-humidifying means of the present invention is set between a CO-purifying section 7 and a fuel-cell power-generating section 8. Therefore, this embodiment will be described mainly on points different from the embodiment 2 by providing FIG. 3 with the same symbol for same portions or corresponding portions as that of FIG. 2(*a*) and omitting detailed descriptions. Moreover, the total-heat exchanger 40 has a water-transmitting film of separating a reformed gas discharged from a CO-purifying section 7 from a material and forming the boundary between the path of the reformed gas and that of the material.

FIG. 3 is a schematic sectional view showing a configuration of a fuel-cell power-generating system of this embodiment. In the case of this embodiment, the full-heat exchanging section 40 humidifies a material by totally heat-exchanging the reformed gas after passing through the CO-purifying section 7 with a material and moving the water vapor in the reformed gas to the material by a water-transmitting film. By humidifying the material, it is possible to decrease the quantity of the water to be supplied from a reforming water-supplying section 4 and control the heating value of the reformer 1.

Moreover, because the reformed gas after passing through the CO-purifying section 7 is usually 100° C. or higher which is higher than the operating temperature of the fuel-cell power-generating section 8, it is possible not only to improve the efficiency of the reformer 1 but also to efficiently lower the reformed-gas temperature up to the temperature of the fuel-cell power-generating section 8 and control the water condensation in the pipe between the CO-purifying section 7 and fuel-cell power-generating section 8 by recovering water vapor and heat from the reformed gas between the CO-purifying section 7 and fuel-cell power-generating section 8 at the present embodiment.

(Embodiment 4)

Figure 4:
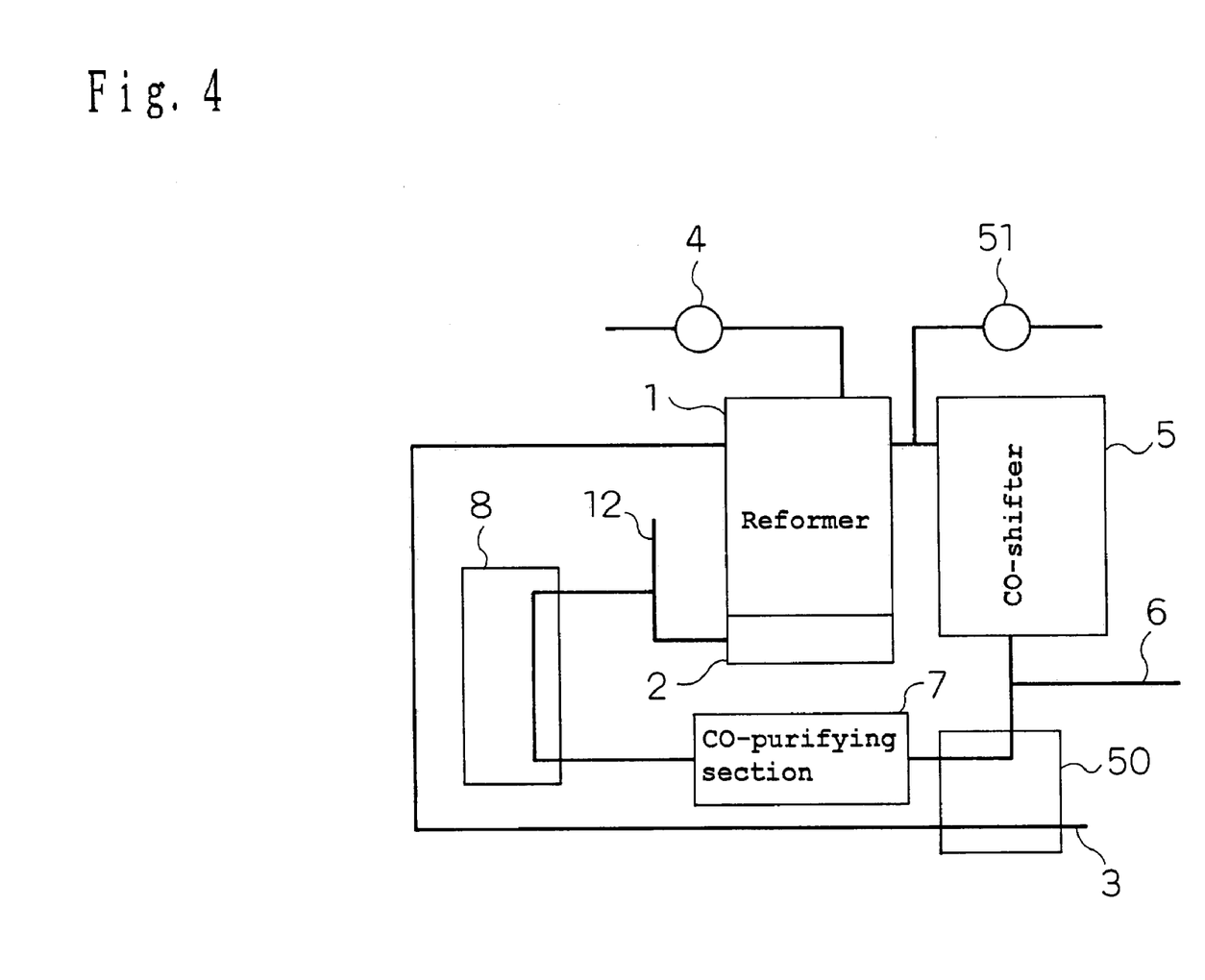
FIG. 4 is a schematic longitudinal sectional view showing a configuration of the fuel-cell power-generating system of an embodiment 4 of the present invention.

Then, embodiment 4 of the present invention will be described below. As shown in FIG. 4, the embodiment 4 is the same as the embodiment 2 except that a total-heat exchanger 50 is set between a CO-shifter 5 and a CO-purifying section 7 and a transformed-water-supplying section 51 for supplying water to the Co-shifter 5 is set at the upstream side of the CO-shifter 5. Therefore, the embodiment 4 is described below mainly on points different from the embodiment 2 by providing FIG. 4 same symbol for same portions or corresponding portions as that of FIG.2(a) and omitting detailed descriptions. Moreover, the total-heat exchanger 50 has a water-transmitting film of separating the reformed gas discharged from the CO-shifter 5 from a material and forming the boundary between the path of the reformed gas and the path of the material similarly to the case of the total-heat exchangers, 30 and 40.

FIG. 4 is a schematic sectional view showing a configuration of a fuel-cell power-generating system of this embodiment.

In the case of the embodiment 3, the water vapor contained in and the heat of the reformed gas are recovered at the downstream side of the CO-purifying section 7. However, at the time of increasing the quantity of water vapor at the shifter, troubles occur that the reactivity in the purifying section located at the downstream side of the shifter is deteriorated due to excessive water vapor and the power-generation efficiency may be deteriorated because the quantity of water vapor becomes excessive in the fuel-cell power-generating section located at the down stream side of the purifying section and thereby water is easily condensed on the electrode surface.

In the case of this embodiment, however, a material and the reformed gas after passing through the CO-shifter 5 are totally heat-exchanged by the full-heat exchanger 50 and the material is humidified by moving the water vapor in the reformed gas to the material through a water-transmitting film. However, because water vapor and heat are recovered from the reformed gas after passing through the CO-shifter 5, it is possible to prevent the reactivity of the CO-purifying section 7 from deteriorating due to excessive water vapor or water is condensed on the electrode surface of the fuel-cell power-generating section 8. Thereby it is possible to decrease the volume of the CO-shifter without deteriorating the efficiency of the hydrogen generation apparatus, and stably reduce a CO concentration.

This embodiment uses the total-heat exchanger 50 as material-humidifying means of the present invention. However, any configuration can be used as long as the configuration makes it possible to recover moisture from the reformed gas output from the CO-shifter 5. For example, it is also allowed to use a method of separating a gas from a liquid by cooling a reformed gas with the water to be supplied to the reformer 1 and CO-shifter 5 by the reforming water-supplying section 4 and the transformed-water-supplying section 51 and condensing the moisture in the reformed gas. Moreover, it is allowed to use a configuration excluding the transforming-water-supplying section 51.

(Embodiment 5)

Figure 5:
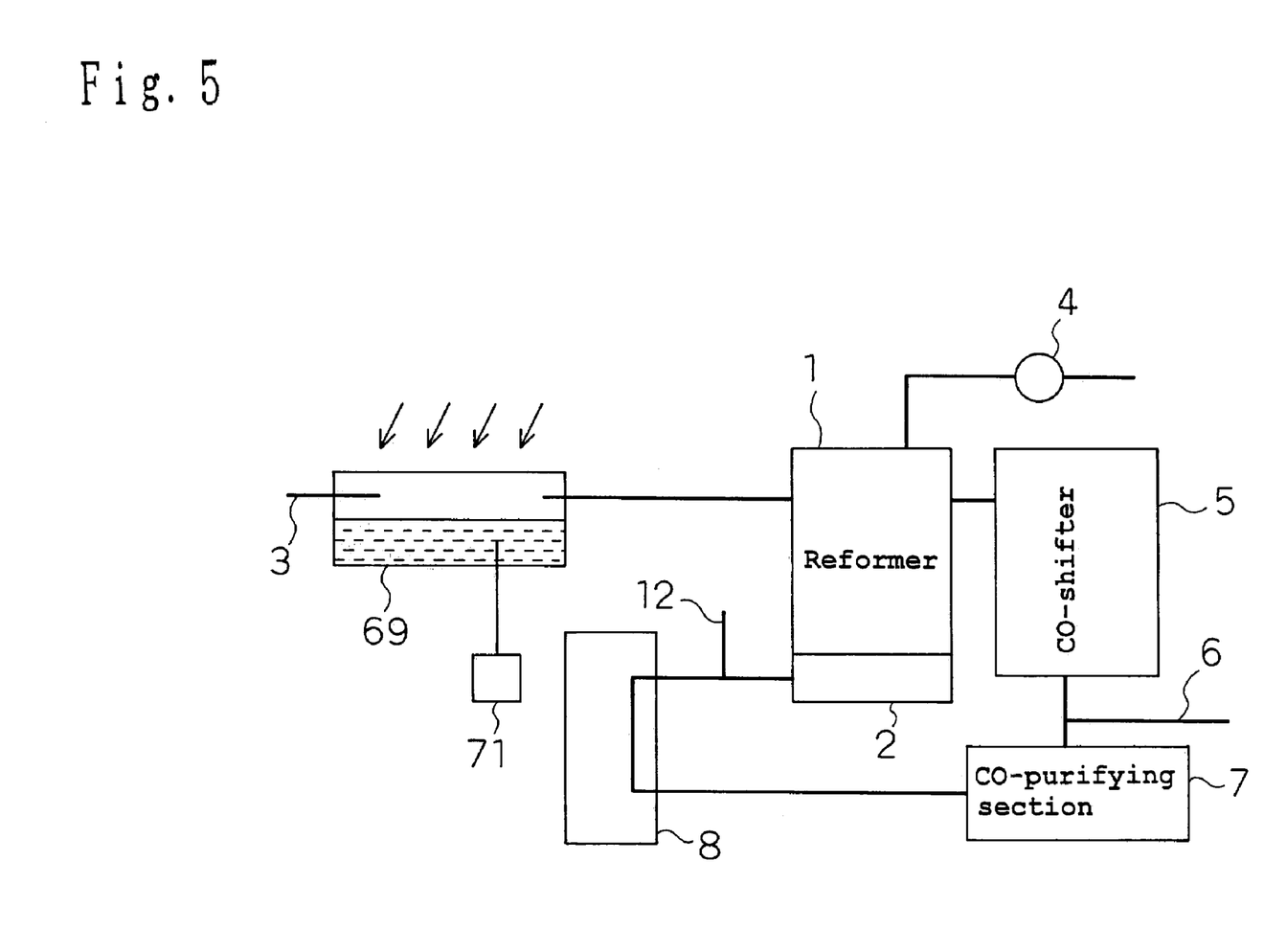
FIG. 5 is a schematic longitudinal sectional view showing a configuration of the fuel-cell power-generating system of an embodiment 5 of the present invention.

Then, embodiment 5 of the present invention will be described below. As shown in FIG. 5, the embodiment 5 is the same as the embodiment 1 except that a material-humidifying section 69 storing the water heated by sunlight therein is set between a material-supplying section 3 and a reformer 1. Therefore, the embodiment 5 is described mainly on points different from the embodiment 1 by providing FIG. 5 with the same symbol for the same portions or corresponding portions as that of FIG.1 and omitting detailed descriptions.

FIG. 5 is a schematic sectional view showing a configuration of a fuel-cell power-generating system of this embodiment. Though the embodiment 1 heats the water in the material-humidifying section 9 by using the heat of the fuel-cell power-generating section 8, a trouble occurs that the efficiency of hot-water supply using the waste heat of the fuel-cell power-generating section 8 is deteriorated.

In the case of this embodiment, however, it is possible to efficiently improve the efficiency of the reformer 1 without deteriorating the hot-water supply efficiency because the water in the material-humidifying section 69 is heated by sunlight.

The same effect can be obtained by using terrestrial heat instead of sunlight at a spa or the like.

(Embodiment 6)

Figure 6:
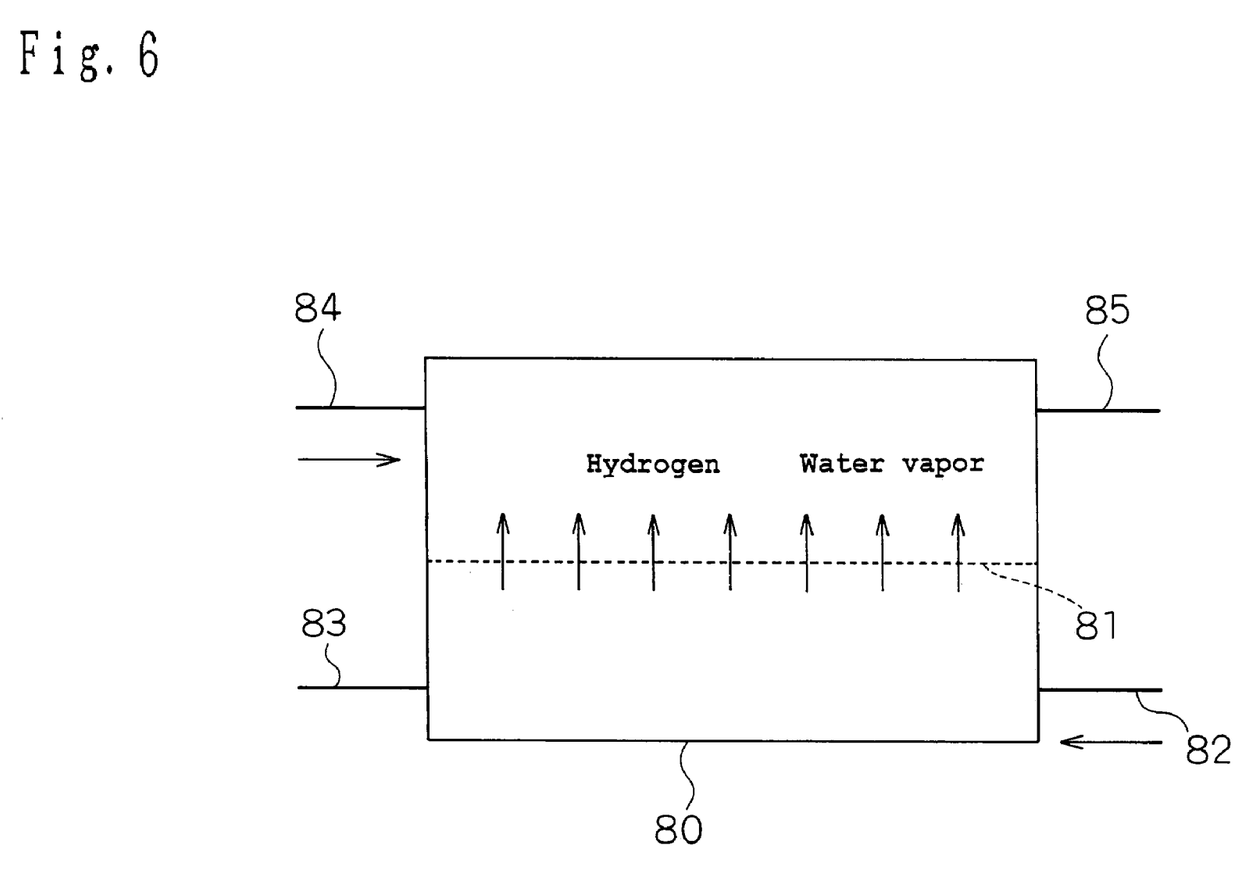
FIG. 6 is a schematic longitudinal sectional view showing a configuration of the material-humidifying section of the fuel-cell power-generating system of an embodiment 6 of the present invention.

Then, embodiment 6 of the present invention will be described below. The embodiment 6 is similar to the embodiment 2 except that a material-humidifying section 80 using a water-hydrogen-transmitting film of transmitting even hydrogen is used instead of the full-heat exchanger 30 having a water-transmitting film 30a. Therefore, this embodiment is described mainly on points different from the embodiment 2 by omitting detailed descriptions.

FIG. 6 is a schematic sectional view of the material-humidifying section 80 of a fuel-cell power-generating system of this embodiment, in which a water-hydrogen-transmitting film 81 of transmitting moisture and hydrogen is formed at the position where the water-transmitting film 30a is provided.

In the case of the embodiment 2, a material is humidified by moving the moisture in an off-gas by the water-transmitting film 30a in the total-heat-exchanging section 30 but the whole hydrogen in the off-gas is supplied to the heating section 2. In the case of this embodiment, however, because some of the hydrogen in an off-gas is returned to a material by transmitting the off-gas from the water-hydrogen-transmitting film 81, it is possible to use the hydrogen not reacting in a fuel-cell power-generating section 8 for fuel-cell power generation again and thereby, the power-generation efficiency is improved.

A polymer electrolytic film used for a polymer fuel cell is used as the water-hydrogen-transmitting film 81. It is publicly known that a polymer electrolytic film transmits hydrogen. However, in a fuel-cell section, hydrogen transmitted without contributing to power generation reacts with oxygen at the cathode side to deteriorate the power-generation efficiency or damages a film. Therefore, various studies for control are made. In general, hydrogen is easily transmitted when the dew point of a circulating gas is low and a film becomes slightly dry. In the case of this embodiment, hydrogen is easily transmitted because a material gas nearby a material-gas entrance 84 and an off-gas nearby an off-gas exit 83 respectively have a low dew point.

A water-hydrogen-transmitting film can use not only a polymer electrolytic film but also a zeolite film having a pore diameter capable of transmitting only hydrogen among carbon dioxide and hydrogen, silicon rubber or a film obtained by mixing a hydrophilic compound such as phosphate into a heat-resistant polymer film such as polyimide.

The driving force of a hydrogen-transmitting film is the difference between hydrogen partial pressures of an off-gas and a material. Therefore, by securing a sufficient area of the film, it is possible to recover hydrogen before the driving force, that is, the difference between hydrogen concentrations of the both sides of a film disappears. However, a designer of a generator can freely select the above mentioned from viewpoints of a cost and a setting space.

Moreover, by laminating films and alternately supplying an off-gas and a material gas to the both sides of each film in order to increase the area of the water-hydrogen-transmitting film 8l, it is possible to realize the recovery of hydrogen and moisture to a material at a small volume.

(Embodiment 7)

Figure 7:
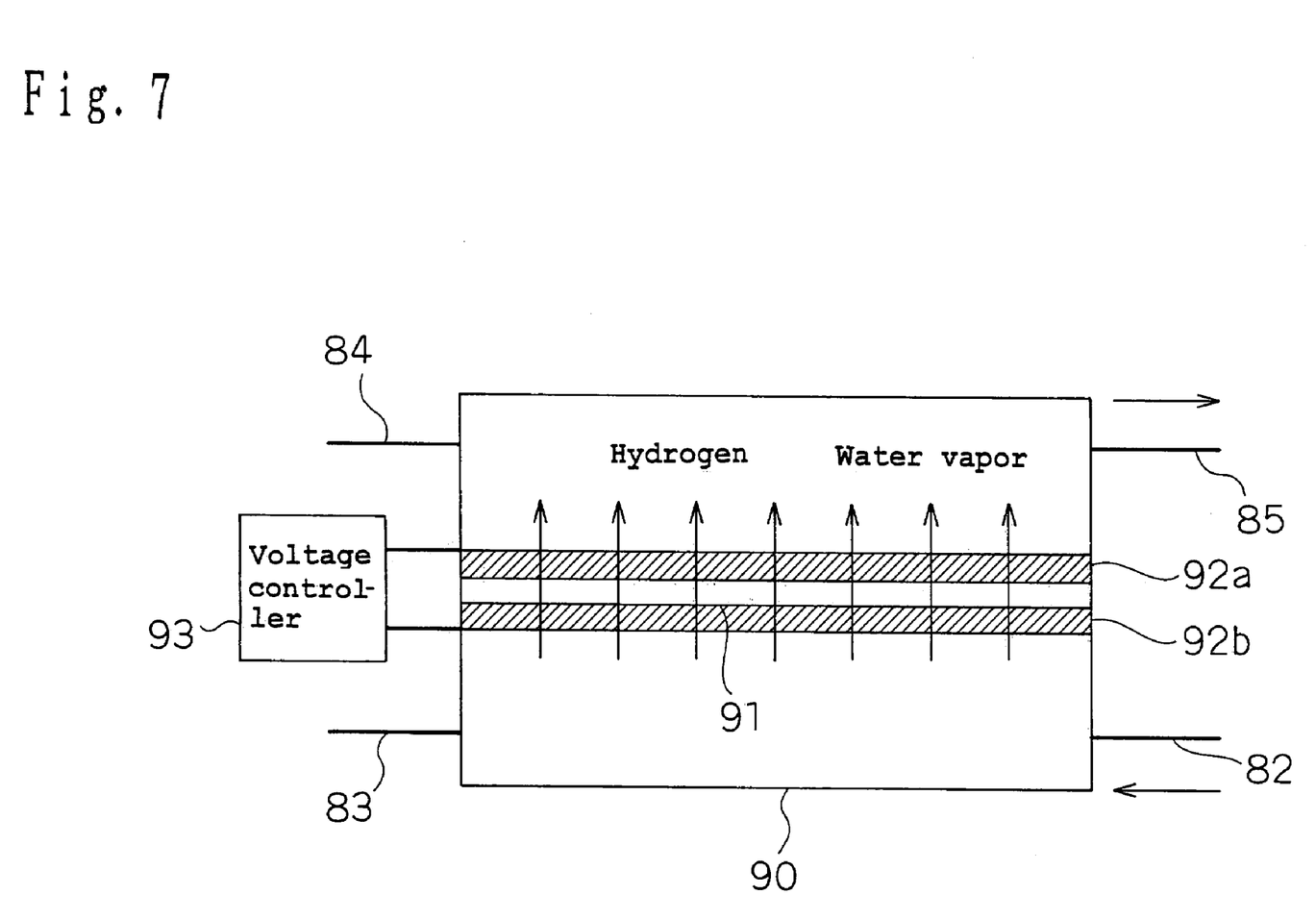
FIG. 7 is a schematic longitudinal sectional view showing a configuration of the material-humidifying section of the fuel-cell power-generating system of an embodiment 7 of the present invention.

Embodiment 7 of the present invention will be described below. As shown in FIG. 7, the embodiment 7 is similar to the embodiment 2 except that a material-humidifying section 90 corresponding to material-humidifying means of the present invention is provided at the downstream side of a fuel-cell power-generating section 8 and the material-humidifying section 90 has the same composition that a carbon electrode 92 carrying platinum is provided on the both faces of proton conductive film 91, as the case of a polymer electric fuel cell. Therefore, this embodiment is described mainly on points different from the embodiment 2 and omitting detailed descriptions.

FIG. 7 is a schematic sectional view of the material-humidifying section 90 of a fuel-cell power-generating system of this embodiment. The proton conductive film 91 on which an electrode 92a facing the flow of an off-gas and an electrode 92b facing the flow of a material are arranged is provided at the position where the water-transmitting film 30a is provided. The electrodes 92a and 92b are connected to an external voltage controller 93 to generate a potential difference in the material-humidifying section 90 in accordance with a voltage applied from the voltage controller 93. In the above configuration, the proton conductive film 91 is an example of a hydrophilic proton conductor and the electrodes 92a and 92b and the voltage controller 93 serve as voltage-applying means of the present invention.

The embodiment 6 humidifies a material by transmitting the moisture and hydrogen in an off-gas depending on the progress by the water-hydrogen-transmitting film 81 in the material-humidifying section 80.

However, this embodiment transmits the hydrogen in an off-gas by applying a voltage to the electrodes 92a and 92b set to the both sides of the proton conductive film 91. Therefore, because the quantity of hydrogen to be transmitted can be controlled and hydrogen ions moves followed by water moleculars, it is possible to more efficiently transmit water and hydrogen. In this case, the potential difference between the electrodes 92a and 92b is set so that the potential of the electrode 92b becomes higher than that of the electrode 92a.

Though a polymer electric fuel cell having a configuration similar to that of the material-humidifying section 90 is constituted by a hydrogen electrode (reformed-gas electrode) and an oxygen electrode (air electrode), in the case of this embodiment, a material gas is circulated instead of oxygen at the oxygen-electrode side. A material gas does not function as an oxidant but it has a function same as an inert gas such as nitrogen. That is, the hydrogen dissociated by a hydrogen electrode becomes ions, and the ions pass through a film and are combined again at the material-gas-side electrode and become hydrogen moleculars. Because the material-humidifying section 90 functions as a concentration cell depending on the difference between hydrogen concentrations of the both electrodes, hydrogen moves by shorting the both electrodes. Moreover, by applying a voltage, it is possible to increase the moving distance of the hydrogen.

Moreover, when a heating section 2 for heating a reformer 1 is present at the downstream side of an off-gas exit 83, it is possible to control the temperature of the reformer 1 by controlling the transmission rate of hydrogen. The transmission rate of hydrogen can be controlled by controlling a voltage to be applied to the electrodes 92a and 92b set to the both faces of the proton conductive film 91 in accordance with the above principle.

EXAMPLES

Example 1

In the case of the fuel-cell power-generating system in FIG. 1, an Ru catalyst of 0.2 L is set into a reformer 1, a copper-zinc catalyst of 2 L is set into a CO-shifter 5, and a Pt catalyst of 0.2 L is set into a CO-purifying section 7. Methane of 7 L/min supplied from a material-supplying section 3 is humidified by a material-humidifying section 9 and moreover, water is added by are forming water-supplying section 4 so that S/C becomes 3 to supply them to the reformer 1. The combustion value of a heating section 2 is adjusted so that the Ru catalyst in the reformer 1 becomes 700° C. to generate a reformed gas and supply the gas to a fuel-cell power-generating section 8. Power is generated by the fuel-cell power-generating section 8 so that DC power becomes 2 kW. A power-generation efficiency of 37% is obtained which is calculated in accordance with the total calorific value of the methane supplied to the material-supplying section 3 and heating section 2 and the DC power of 2 kW by adjusting the flow rate of cooling water so that the temperature-detected by a cooling-water-temperature-detecting section 11 becomes 80° C.

Example 2

In the case of the fuel-cell power-generating system in FIG. 2, a catalyst is set into a reformer 1, CO-shifter 5, and CO-purifying section 7 respectively, similarly to the case of the example 1. Methane of 7 L/min supplied from a material-supplying section 3 is humidified by a total-heat-exchanging section 30, moreover water is added by a reforming water-supplying section 4 so that S/C becomes 3 to supply them to the reformer 1. The combustion value of a heating section 2 is adjusted so that the Ru catalyst in the reformer 1 becomes 700° C. to generate a reformed gas and supply the gas to a fuel-cell power-generating section 8. Power is generated by the fuel-cell power-generating section 8 so that DC power becomes 2 kW. A power-generation efficiency of 38% is obtained which is calculated in accordance with the total calorific value of the methane supplied to the material-supplying section 3 and heating section 2 and the DC power of 2 kW.

Example 3

In the case of the fuel-cell power-generating system in FIG. 4, a copper-zinc catalyst of 1 L is set into a CO-shifter 5. A quantity of a catalyst equal to the case of the example 1 is set into a reformer 1 and CO-purifying section 7 respectively. Methane of 7 L/min supplied from a material-supplying section 3 is humidified by a total-heat-exchanging section 50 and moreover, water is added by a reforming water-supplying section 54 so that S/C becomes 3 to supply them to the reformer 1. The combustion value of a heating section 2 is adjusted so that the Ru catalyst in the reformer 1 becomes 700° C. to generate a reformed gas. Water is supplied by a shifting-water-supplying section 51 at the upstream side of a CO-shifter 5 so that S/C becomes 5. Power is generated by a fuel-cell power-generating section 8 so that DC power becomes 2 kW. A power-generation efficiency of 39% is obtained which is calculated in accordance with the total calorific value of the methane supplied to the material-supplying section 3 and heating section 2 and the DC power of 2 kW.

Example 4

In the case of the fuel-cell power-generating system in FIG. 4, a copper-zinc catalyst of 1 L is set into a CO-shifter 5. A quantity of a catalyst equal to the case of the example 1 is set into a reformer 1 and CO-purifying section 7 respectively. Methane of 7 L/min supplied from a material-supplying section 3 is humidified by a total-heat-exchanging section 50 and moreover, water is added by a reforming water-supplying section 54 so that S/C becomes 3 to supply them to the reformer 1. The combustion value of a heating section 2 is adjusted so that the Ru catalyst in the reformer 1 becomes 700° C. to generate a reformed gas. Water is supplied by a shifting-water-supplying section 51 at the upstream side of a CO-shifter 7 so that S/C becomes 5. Power is generated by a fuel-cell power-generating section 8 so that DC power becomes 2 kW. A power-generation efficiency of 39% is obtained which is calculated in accordance with the total calorific value of the methane supplied to the material-supplying section 3 and heating section 2 and the DC power of 2 kW.

Example 5

In the case of the fuel-cell power-generating system in FIG. 5, methane of 7 L/min supplied from a material-supplying section 3 is humidified by a material-humidifying section 69 and supplied to a reformer 1 similarly to the case of the example 1. A material-humidifying section 69 is painted black so that it is sufficiently exposed to sunlight. As a result of measuring the water temperature in the material-humidifying section 69 with a humidified-water-temperature-detecting section 71, the water temperature shows 93° C. As a result of measuring the water-vapor quantity of the gas after passing through the material-humidifying section 69, S/C shows 3.1. Therefore, water is not added to a reforming water-supplying section 4. The combustion value of a heating section 2 is adjusted so that the Ru catalyst in the reformer 1 becomes 700° C. to generate a reformed gas and supply the gas to a fuel-cell power-generating section 8. Power is generated by the fuel-cell power-generating section 8 so that DC power becomes 2 kW. A power generation efficiency of 41% is obtained which is calculated in accordance with the total calorific value of the methane supplied to the material-supplying section 3 and heating section 2 and the DC power of 2 kW.

Example 6

In the case of the fuel-cell power-generating system in FIG. 2, a catalyst is set into a reformer 1, CO-shifter 5, and CO-purifying section 7 respectively, similarly to the case of the example 1. The material-humidifying section 80 shown in FIG. 6 is set instead of the total-heat-exchanging section 30. The methane of 7 L/min supplied from a material-supplying section 3 is humidified by the material-humidifying section 80 and moreover, water is added by a reforming water-supplying section 4 so that S/C becomes 3 to supply them to the reformer 1. The combustion value of a heating section 2 is adjusted so that the Ru catalyst in the reformer 1 becomes 700° C. to generate a reformed gas, supply the gas to a fuel-cell power-generating section 8, and make the section 8 generate power. A power-generation efficiency of 41.5% is obtained which is calculated in accordance with the total calorific value of the methane supplied to the material-supplying section 3 and heating section 2 and the generated DC power.

Example 7

In the fuel-cell power-generating system in FIG. 2, a catalyst is set into a reformer 1, CO-shifter 5, and CO-purifying section 7 respectively, similarly to the case of the example 1. The material-humidifying section 90 shown in FIG. 7 is set instead of the total-heat-exchanging section 30. The methane of 7 L/min supplied from a material-supplying section 3 is humidified by a material-humidifying section 80 and moreover water is added by a reforming water-supplying section 4 so that S/C becomes 3 to supply them to the reformer 1. The combustion value of a heating section 2 is adjusted so that the Ru catalyst in the reformer 1 becomes 700° C. to generate a reformed gas, supply the gas to a fuel-cell power-generating section 8, and make the section 8 generate power. A voltage of 200 mv is applied to electrodes 92a, 92b at the both faces of a proton conductive film 91. A power generation efficiency of 42% is obtained which is calculated in accordance with the total calorific value of the methane supplied to the material-supplying section 3 and heating section 2 and the generated DC power.

Comparative Example 1

In the case of the example 1, the methane of 7 L/min supplied from the material-supplying section 3 is directly supplied to the reformer 1 without humidifying the methane by the material-humidifying section 9. Similarly to the case of the example 1, power is generated by a fuel-cell power-generating section 8 so that DC power becomes 2 kW. The flow rate of cooling water is adjusted so that the temperature detected by a cooling-water-temperature-detecting section 11 becomes 80° C. A power generation efficiency of 33% is obtained which is calculated in accordance with the total calorific value of the methane supplied to the material-supplying section 3 and heating section 2 and the DC power of 2 kW.

Each of the above embodiments is described as a fuel-cell power-generating system including the fuel-cell power-generating section 8. However, it is also allowed to realize the present invention as a single hydrogen generation apparatus excluding the fuel-cell power-generating section 8.

Moreover, in the case of each of the above embodiments, a fuel-cell power-generating system forms a cycle of supplying the off-gas discharged from the fuel-cell power-generating section 8 to the heating section 2 of the reformer 1. However, it is also allowed to use the off-gas discharged from the fuel-cell power-generating section 8 for other external means and a fuel-cell power-generating system of the present invention does not have to form any kind of closed cycles to circulate any gas and materials.

Moreover, in each of the above embodiments, to humidify a material is there formed gas directly outputted from reformer 1 or off gas outputted from a fuel-cell power-generation system 8, but the present invention is not limited such a composition. What is meant that material-humidifying means of humidifying material indirectly in the present invention maybe to moisture the material by gas other than reformed gas directly outputted from reformer 1 in the fuel-cell power-generation system.

Moreover, in the case of the above example 5, it is assumed that external means of the present invention is the material-humidifying section 69 to which heat is supplied in the form of sunlight or terrestrial heat. However, external means is not restricted to the section 69. It is allowed to use a system serving as a heat source and moisture-supply source for a material such as a boiler and a refrigerator independent from a fuel-cell power-generating system.

As described above, according to the present invention, a heating value necessary for water evaporation can be controlled by a reformer.

Moreover, by fully-heat-exchanging the off-gas after passing through a fuel-cell power-generating section with a material, it is possible to not only control the heating value necessary for water evaporation but also to remove water vapor from the off-gas. Therefore, it is possible to prevent the flame temperature in a heating section from lowering.

Furthermore, by totally-heat-exchanging the reformed gas after passing through a CO-purifying section with a material, it is possible to not only control the heating value necessary for water evaporation but also efficiently lower the reformed-gas temperature up to operating temperature of a fuel-cell power-generating section and simultaneously control condensation of the water in a pipe.

Furthermore, by totally-heat-exchanging the reformed gas after passing through a CO-shifter with a material, it is possible not only to control the heating value necessary for water evaporation but also decrease the volume of the CO-shifter and stably reduce a CO concentration.

Furthermore, by heating a material-humidifying section with sunlight, it is possible to improve the efficiency of a hydrogen-generating section without deteriorating the hot-water supply efficiency.

Thus, according to the present invention, it is possible to provide a fuel-cell power-generating system having a high power-generation efficiency.

As described above, according to the present invention, it is possible to improve the efficiency of a hydrogen generation apparatus and reduce the catalyst volume of a CO-shifter.

What is claimed is:

1. A fuel-cell power-generating system comprising:
   a hydrogen generation apparatus having: a reformer of generating a reformed gas containing at least hydrogen and carbon monoxide by making a material containing an organic compound react with water; carbon-monoxide-removing means including at least a shifter reducing the carbon monoxide contained in the reformed gas generated by said reformer in accordance with a shift reaction; and material-humidifying means of humidifying said material by using moisture contained in the reformed gas; and
   a fuel cell of generating power by the reformed gas supplied from said hydrogen generation apparatus,
   wherein said material-humidifying means of said hydrogen generation apparatus humidifies the material by using moisture contained in the reformed gas supplied from said carbon-monoxide-removing means.

2. A fuel-cell power-generating system comprising:
   a hydrogen generation apparatus having: a reformer of generating a reformed gas containing at least hydrogen and carbon monoxide by making a material containing an organic compound react with water; carbon-monoxide-removing means including at least a shifter reducing the carbon monoxide contained in the reformed gas generated by said reformer in accordance with a shift reaction; and material-humidifying means of humidifying said material by using moisture contained in the reformed gas; and
   a fuel cell of generating power by the reformed gas supplied from said hydrogen generation apparatus,
   wherein said material-humidifying means of said hydrogen generation apparatus humidifies the material by using moisture contained in the reformed gas supplied from said carbon-monoxide-removing means, and
   said material-humidifying means has a transmission film of transmitting at least moisture and said transmission film is provided so as to form the boundary between the path of the reformed gasa and the path of the material.

3. The hydrogen generation apparatus according to claim 2, wherein said transmission film also transmits hydrogen.

4. The hydrogen generation apparatus according to claim 2, wherein said material-humidifying means heat-exchanges the reformed gas with the material.

* * * * *

UNITED STATES PATENT AND TRADEMARK OFFICE
CERTIFICATE OF CORRECTION

| | | |
|---|---|---|
| PATENT NO. | : 7,201,983 B2 | Page 1 of 1 |
| APPLICATION NO. | : 10/323040 | |
| DATED | : April 10, 2007 | |
| INVENTOR(S) | : Kiyoshi Taguchi et al. | |

It is certified that error appears in the above-identified patent and that said Letters Patent is hereby corrected as shown below:

Title Page, Item (56) References Cited, FOREIGN PATENT DOCUMENTS
Change "WO    WO 01/48849 A    7/2001"
to -- WO    01/48849 A    7/2001 --

Column 16
Line 39, change "gasa" to -- gas --

Signed and Sealed this

Fourteenth Day of August, 2007

JON W. DUDAS
*Director of the United States Patent and Trademark Office*